March 31, 1931.   G. H. HUFFERD   1,798,843
TIE ROD
Filed Dec. 24, 1927
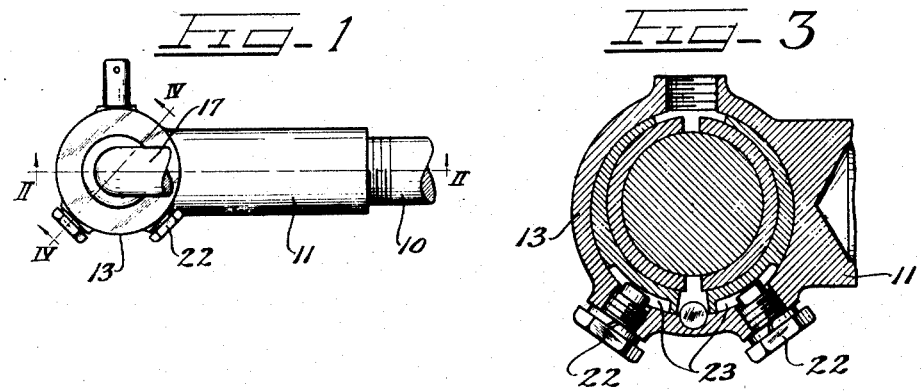
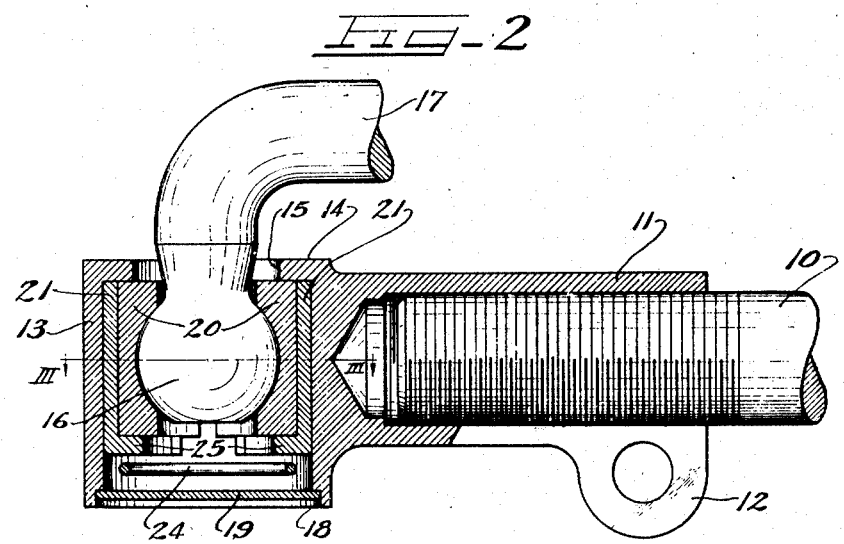
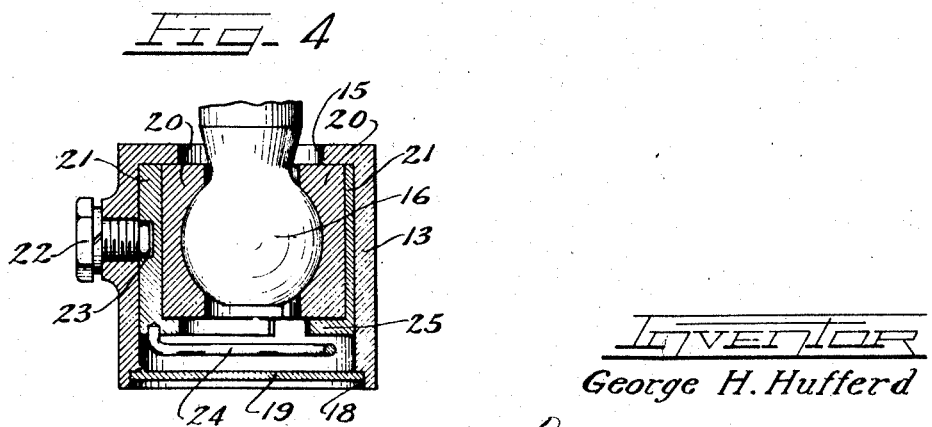
Inventor
George H. Hufferd Patented Mar. 31, 1931

1,798,843

UNITED STATES PATENT OFFICE

GEORGE H. HUFFERD, OF DETROIT, MICHIGAN, ASSIGNOR TO THOMPSON PRODUCTS, INC., A CORPORATION OF OHIO

TIE-ROD

Application filed December 24, 1927. Serial No. 242,340.

This invention relates to an improved form of wear compensating ball joint connection wherein the ball end is formed integral with the part to be controlled, as with a steering arm of a vehicle steering mechanism.

It is an object of this invention to provide an improved non-yielding ball joint connection that will be wear compensating and safe from dropping off the ball under any condition of use. Clearance requirements in automotive vehicles require that a tie rod be hung below the steering arms and, when the ball studs are formed integrally with the arms, it is highly desirable to provide a housing which, when once assembled on the ball, will be proof against accidental separation therefrom.

It is also an object of this invention to provide an improved form of ball joint connection wherein the ball seats are formed with outer cylindrical surfaces co-axial with the ball, and opposed segments of a wedge-like section are interposed between the ball seat members and the housing, the segments being urged apart to take up wear and so formed and secured in the housing as to insure against longitudinal movement therein.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of a ball joint housing embodying the features of this invention.

Figure 2 is an end section on the line II—II of Figure 1.

Figure 3 is a section on the line III—III of Figure 2.

Figure 4 is an end section on the line IV—IV of Figure 1.

As shown on the drawings:

In Figures 1 and 2 a ball joint housing is shown in connection with the threaded end 10 of a tie rod, a slotted sleeve 11 integral with the housing being screwed thereon and clamped in its adjusted position by a bolt passing through ears 12 on either side of the slot. The housing proper is formed as a vertical cylinder 13 having a top closure or inturned flange 14 with a central aperture 15 therein sufficiently large to admit a ball end 16 formed integral with a steering arm 17. The open bottom of the cylinder 13 is formed with a recess 18 to receive an initially dished plug 19, which is forced into a plane shape after seating in the recess, the resulting expansion of the plug effectively locking it into place.

The ball end 16 seats between hardened ball seat members 20 comprising inner semi-spherical surfaces forming the bearing seat proper, and outer cylindrical surfaces of less diameter than the housing, the space between the ball seat members and the housing being taken up by circumferentially adjustable sleeve members 21 which are formed with a curved wedge-like section when viewed end on, as in Figure 3, the wedging faces of said sleeve members being convergent circumferentially. These sleeve members are restrained against longitudinal movement in the housing by means of pin-ended cap screws 22 extending through the wall of the housing, which screws project into elongated slots 23 in the sleeve members. The sleeve members are urged apart at the big end of these wedge-like sections by means of a circular spring 24, the ends of which are suitably engaged in the sleeve members. The lower ends of the sleeve members are formed with inwardly extending flanges 25 which support the ball seat members to prevent longitudinal movement thereof. Rotation of the sleeve members in the housing is limited by means of a pin or dowel 26 set into the wall of the housing.

In assembling this ball joint, the tie rod with the empty housing 13 thereon is pushed up over the ball end 16, sufficient play being present to permit the insertion of the two ball seat members, one at a time. The sleeve members are then positioned between the seat members and the housing, and are retained in place by the cap screws 22. The spring is then added and the plug forced into place.

It will be evident from the foregoing description that the housing cannot drop off the ball end and that the adjustment is in service non-yielding to an extent sufficient to prevent play, while yielding to an extent sufficient to prevent binding, as, if the ball seats seize on the ball, one of them will be rotated by a movement of the joint sufficiently to slightly back out one of the wedge-like sleeve members, while a straight pull or push, such as would result from a wheel striking an obstacle, would not act to release the wedge-like sleeve members.

It will thus be seen that I have produced a simple, safe and reliable self-adjusting ball joint for integral balls that will maintain wheel alignment throughout the range of adjustment for wear.

I am aware that many changes may be made, and numerous details of construction may be varied through a wide range without departing from the principles of this invention, and I, therefore, do not purpose limiting the patent granted hereon, otherwise than necessitated by the prior art.

I claim as my invention:

1. A ball and socket joint comprising a ball, a housing having a cylindrical bore, with an aperture sufficient to admit the ball, a cover closing said aperture, ball seat members in said housing having cylindrical outer surfaces of a smaller diameter than the diameter of the cylindrical housing, opposed wedge-like sleeve members interposed between the ball seat members and the housing, and means for adjusting said sleeve members to compensate for wear.

2. A ball and socket joint comprising a ball, a housing having a cylindrical bore, with an aperture sufficient to admit the ball, a cover closing said aperture, ball seat members in said housing having cylindrical outer surfaces of a smaller diameter than the diameter of the cylindrical housing, opposed wedge-like sleeve members interposed between the ball seat members and the housing, means retaining said sleeve members and ball seats in said housing, and means for adjusting said sleeve members to compensate for wear.

3. A ball and socket joint comprising a ball, a housing having a cylindrical bore with an aperture sufficient to admit the ball, a cover closing said aperture, ball seat members in said housing having cylindrical outer surfaces of a smaller diameter than the diameter of the cylindrical housing, opposed wedge-like sleeve members interposed between the ball seat members and the housing, means restraining said sleeve members from longitudinal motion in said housing, and means for adjusting said sleeve members to compensate for wear.

4. A ball and socket joint comprising a ball, a housing having a cylindrical bore with an aperture sufficient to admit the ball, a cover closing said aperture, ball seat members in said housing having cylindrical outer surfaces of a smaller diameter than the diameter of the cylindrical housing, opposed wedge-like sleeve members, whose wedging surfaces converge circumferentially and which are capable of circumferential displacement to compensate for wear interposed between the ball seat members and the housing, means for adjusting said sleeve members circumferentially to compensate for wear and means for limiting circumferential displacement of said sleeve members.

5. A ball and socket joint comprising a ball stud, a housing for the ball end thereof, ball seats engaging said ball end, opposed wedge-like sleeve members, whose wedging surfaces converge circumferentially and which are capable of circumferential displacement to compensate for wear, interposed between the ball seats and housing, and means for adjusting said sleeve members circumferentially to compensate for wear.

6. A ball and socket joint comprising a ball stud, a housing for the ball end thereof, ball seats engaging said ball end, opposed wedge-like sleeve members, whose wedging surfaces converge circumferentially and which are capable of circumferential displacement to compensate for wear, interposed between the ball seats and housing, means for adjusting said sleeve members circumferentially to compensate for wear, and means for limiting circumferential displacement of said sleeve members.

7. A ball and socket joint comprising a ball stud, a housing for the ball end thereof having a cylindrical inner wall, ball seat members in said housing having cylindrical outer walls, opposed wedge-like sleeve members, whose wedging surfaces converge circumferentially and which are capable of circumferential displacement to compensate for wear, interposed between said ball seats and said inner housing wall, and resilient means urging said sleeve members apart at their thicker ends to compensate for wear.

8. A ball and socket joint comprising a ball stud, a housing for the ball end thereof having a cylindrical inner wall, ball seat members in said housing having cylindrical outer walls, opposed wedge-like sleeve members, whose wedging surfaces converge circumferentially and which are capable of circumferential displacement to compensate for wear, interposed between said ball seats and said inner housing wall, resilient means urging said sleeve members apart at their thicker ends to compensate for wear, and means engaging said sleeve members intermediate their ends restraining said sleeve members from longitudinal movement in said housing.

9. A ball and socket joint comprising a ball stud having a ball end, a housing therefor having a cylindrical bore providing an opening at one end sufficient to admit the ball, a closure for the other end of said bore, full enveloping ball seat members in said housing having outer cylindrical surfaces of less diameter than the diameter of said cylindrical housing, opposed wedge-like sleeve members, whose wedging surfaces converge circumferentially and which are capable of circumferential displacement to compensate for wear, interposed between the ball seat members and housing, and means for adjusting said sleeve members circumferentially to compensate for wear.

10. A ball and socket joint comprising a ball stud having a ball end, a housing therefor having a cylindrical bore providing an opening at one end sufficient to admit the ball, a closure for the other end of said bore, full enveloping ball seat members in said housing having outer cylindrical surfaces of less diameter than the diameter of said cylindrical housing, opposed wedge-like sleeve members, whose wedging surfaces converge circumferentially and which are capable of circumferential displacement to compensate for wear, interposed between the ball seat members and housing, means for adjusting said sleeve members circumferentially to compensate for wear, and means for limiting circumferential displacement of said sleeve members.

11. A ball and socket joint comprising a ball stud having a ball end, a housing therefor having a cylindrical bore providing an opening at one end sufficient to admit the ball, a closure for the other end of said bore, full enveloping ball seat members in said housing having outer cylindrical surfaces of less diameter than the diameter of said cylindrical housing, opposed wedge-like sleeve members whose wedging surfaces converge circumferentially and which are capable of circumferential displacement to compensate for wear, interposed between the ball seat members and housing, said sleeve members having lower inturned flanges for supporting said ball seat members, and resilient means engaging the lower ends of said sleeve members and urging said sleeve members into wedging engagement with the ball seat members to compensate for wear.

12. A ball joint comprising a housing, a ball of a ball stud therein, seat members surrounding said ball having cylindrical outer surfaces, opposed wedge-like sleeve members between and in contact with said seat members and said housing, and means for adjusting said sleeve members to compensate for wear.

13. A ball joint for tie rods of automotive vehicles, comprising a housing having an inner cylindrical surface, a ball of a ball stud disposed within said housing, a pair of circumferentially spaced ball seats having segmental spherical inner bearing surfaces in contact with said ball and having outer cylindrical surfaces concentric with said segmental spherical surfaces, similarly spaced wedge-like sleeves having inner and outer surfaces conforming and in contact with the outer surfaces of said ball seats and the inner surface of said housing respectively and resilient means urging said wedge-like sleeves in the direction of their thinner ends.

In testimony whereof I have hereunto subscribed my name.

GEORGE H. HUFFERD.